(12) United States Patent
Imade et al.

(10) Patent No.: US 11,051,381 B2
(45) Date of Patent: Jun. 29, 2021

(54) POWER SUPPLY APPARATUS, SEMICONDUCTOR INTEGRATED CIRCUIT, AND RIPPLE SUPPRESSING METHOD

(71) Applicants: Daisuke Imade, Isehara (JP); Hiroki Matsuda, Zama (JP); Satoshi Arima, Isehara (JP)

(72) Inventors: Daisuke Imade, Isehara (JP); Hiroki Matsuda, Zama (JP); Satoshi Arima, Isehara (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 16/881,197

(22) Filed: May 22, 2020

(65) Prior Publication Data
US 2020/0389959 A1    Dec. 10, 2020

(30) Foreign Application Priority Data

Jun. 5, 2019 (JP) .............................. JP2019-105277

(51) Int. Cl.
| H05B 45/37   | (2020.01) |
| H05B 45/3725 | (2020.01) |
| H05B 45/40   | (2020.01) |
| H02M 3/335   | (2006.01) |

(52) U.S. Cl.
CPC ......... *H05B 45/3725* (2020.01); *H05B 45/40* (2020.01); *H02M 3/33507* (2013.01)

(58) Field of Classification Search
CPC ........ H05B 45/37; H05B 45/44; H05B 45/46; H05B 45/50; H05B 45/395
See application file for complete search history.

(56) References Cited

U.S. PATENT DOCUMENTS

| 9,013,899 B2* | 4/2015 | Shimada | H02M 3/33507 363/21.15 |
| 10,491,128 B2 | 11/2019 | Arima et al. | |
| 10,536,082 B2 | 1/2020 | Imade et al. | |
| 2009/0295776 A1* | 12/2009 | Yu | H05B 45/46 345/212 |
| 2011/0254462 A1* | 10/2011 | Ruan | H05B 45/38 315/291 |

(Continued)

FOREIGN PATENT DOCUMENTS

| JP | 2012200118 A | 10/2012 |
| JP | 2019121359 A | 7/2019 |

*Primary Examiner* — Tung X Le
(74) *Attorney, Agent, or Firm* — Holtz, Holtz & Volek PC

(57) ABSTRACT

A power supply apparatus includes a voltage conversion circuit, a reference voltage generating circuit, a constant current control circuit which includes a current controller and a differential circuit which controls the current controller based on the reference voltage and current detection voltage showing a size of the output current, and wherein an electric current on the current path is controlled by the current controller a reference voltage adjustment circuit which adjusts a first reference voltage generated by the reference voltage generating circuit to converge a ripple occurring in the output current to a predetermined ripple rate or less, based on a voltage of a first potential point set on the current path from an output portion on a high potential side of the voltage conversion circuit to the current controller and a control voltage of the current controller.

6 Claims, 12 Drawing Sheets

(56) References Cited

U.S. PATENT DOCUMENTS

| | | | |
|---|---|---|---|
| 2013/0099694 A1* | 4/2013 | Naruo | H05B 45/10 |
| | | | 315/224 |
| 2014/0218978 A1* | 8/2014 | Heuken | H02M 3/33523 |
| | | | 363/21.16 |
| 2014/0354186 A1 | 12/2014 | Sun et al. | |
| 2017/0188420 A1* | 6/2017 | Kido | H05B 47/11 |
| 2017/0318639 A1 | 11/2017 | Wang et al. | |
| 2018/0063911 A1* | 3/2018 | Bai | H05B 45/00 |
| 2018/0324916 A1* | 11/2018 | Lai | H05B 45/20 |

* cited by examiner

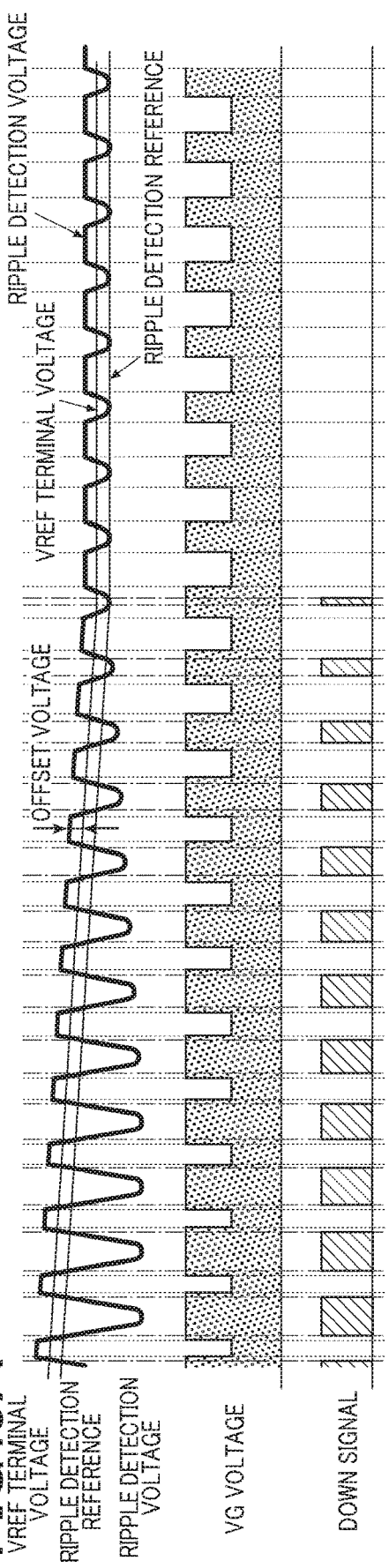
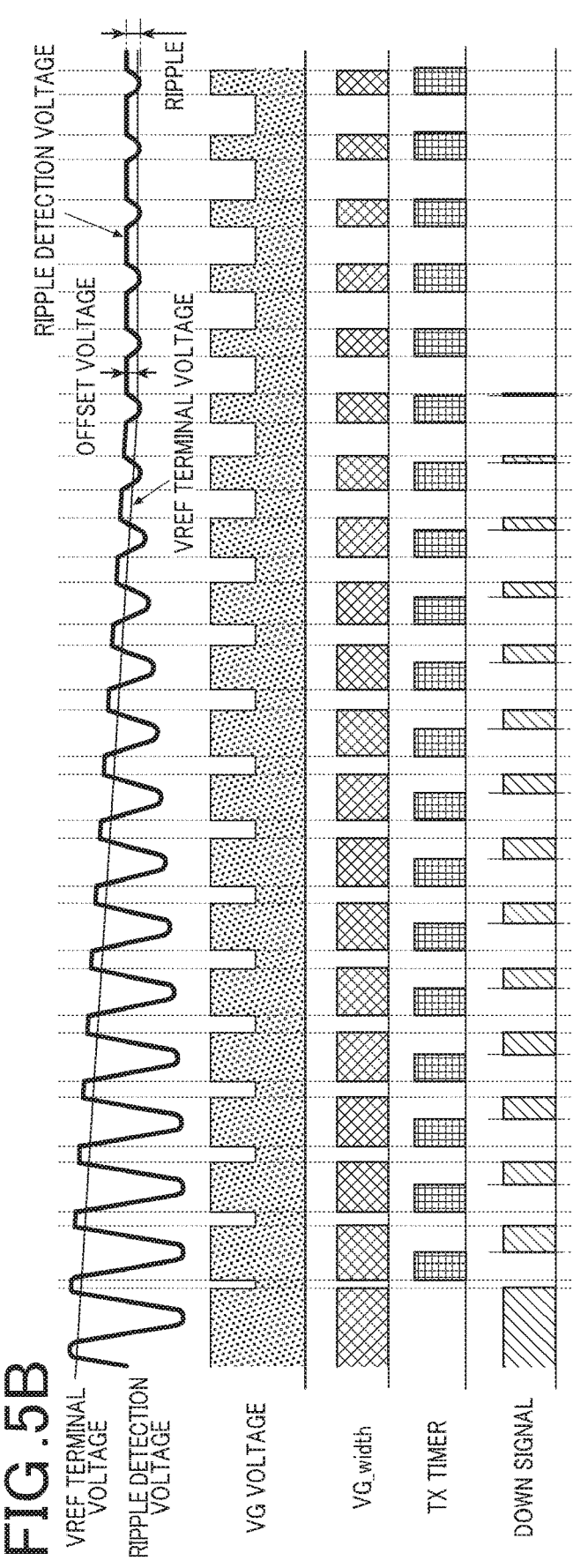

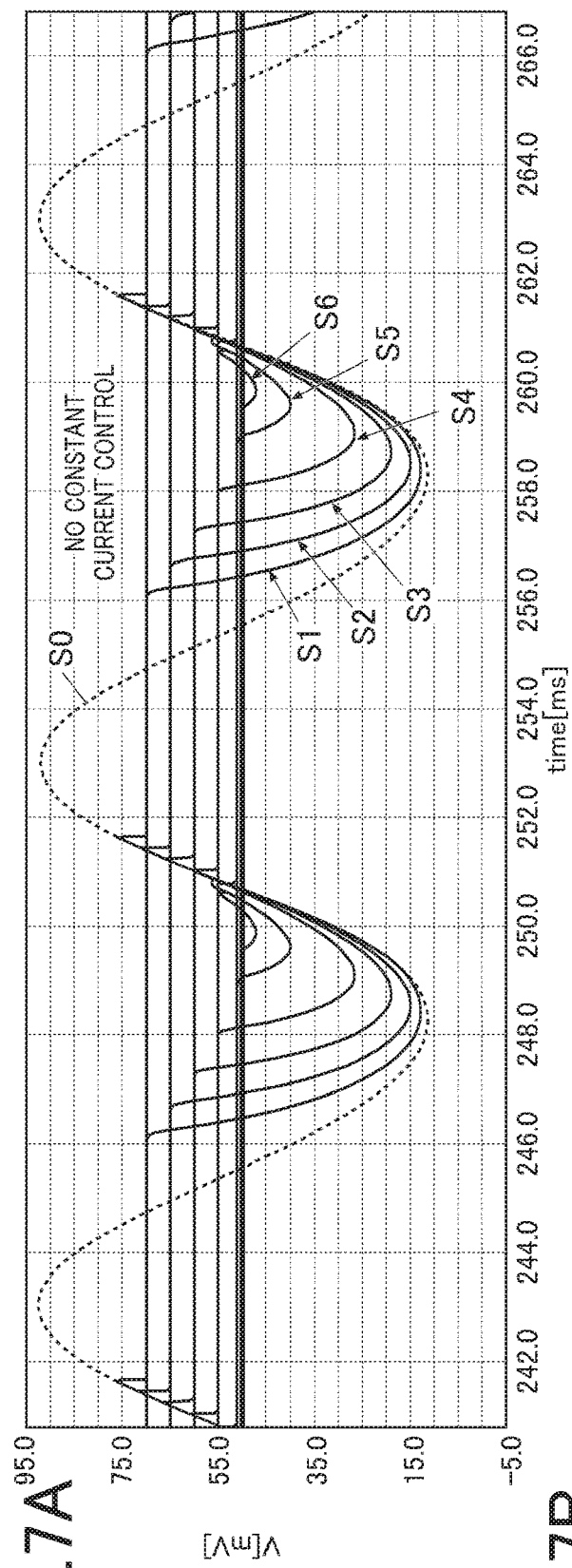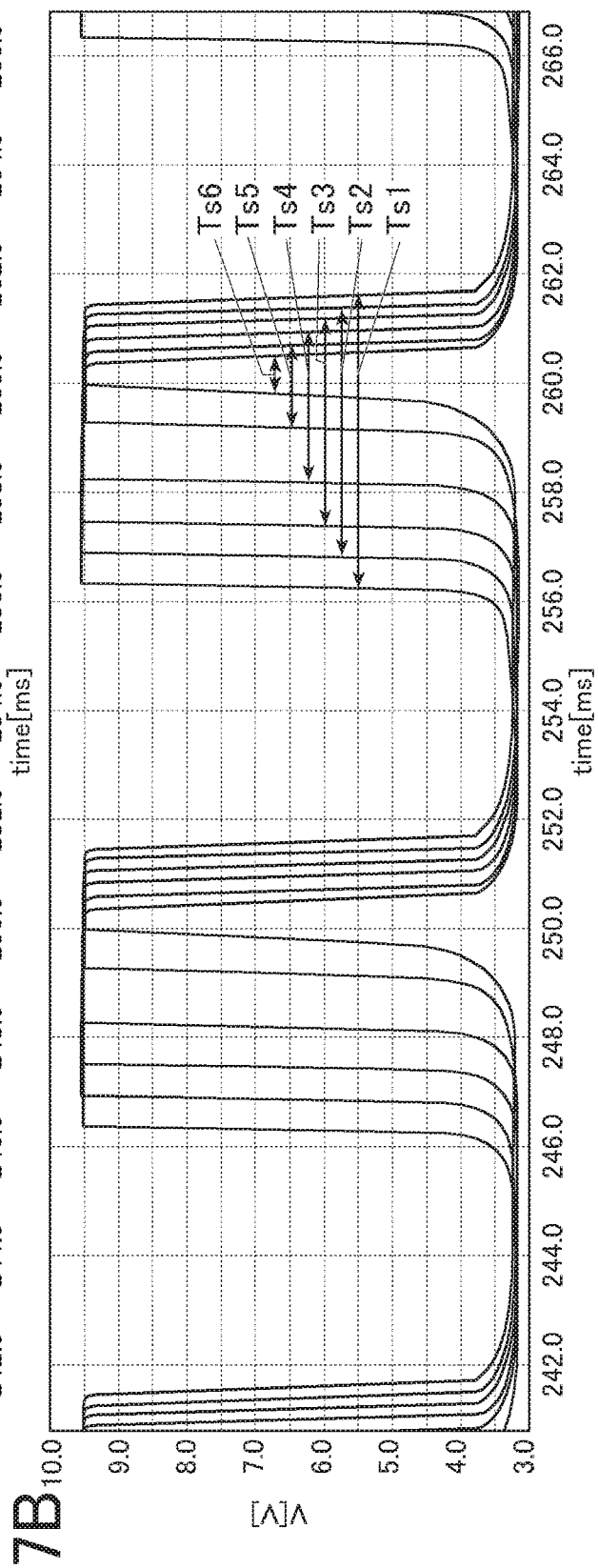

POWER SUPPLY APPARATUS, SEMICONDUCTOR INTEGRATED CIRCUIT, AND RIPPLE SUPPRESSING METHOD

CROSS-REFERENCE TO RELATED APPLICATION

This application is based upon and claims the benefit of priority from the prior Japanese Patent Application No. 2019-105277, filed on Jun. 5, 2019, the entire contents of which are incorporated herein by reference.

BACKGROUND

Technological Field

The present invention relates to a power supply apparatus, a semiconductor integrated circuit, and a ripple suppressing method. Specifically, the present invention relates to a technique which is effective when used in a power supply apparatus, a semiconductor integrated circuit, and a ripple suppressing method employing a switching method in which a switching element controls an electric current flowing in a primary side coil of a transformer to generate a DC voltage from an AC power supply.

Description of Related Art

A conventional constant current power supply apparatus which generates DC voltage from an AC power supply to light a light emitting diode is disclosed in JP 2012-200118. In such constant current power supply apparatus, a transistor and a current detection resistor are connected in series in an electric current path of an output current output to a light emitting diode in order to switch between on and off to turn on and turn off the light emitting diode.

There is a rising demand and an increase in regulations to suppress higher harmonic waves in power saving lighting equipment using a light emitting diode. In a power supply apparatus employing a switching method which controls an electric current flowing in a primary side coil of a transformer using a switching element to generate a DC voltage from an AC power supply, if simple methods such as a one convertor method or a constant-on method (predetermined on time) are used to enable higher harmonic waves suppressing functions without increasing costs, ripples relying on the frequency of the AC power supply tend to occur in the output voltage on the secondary side.

In a power supply apparatus employing the switching method, even if a ripple occurs in the output voltage, the ripple can be removed from the output current by performing constant current control. The inventors of the present invention considered a constant current circuit in which an electric current controlling transistor is provided in the electric current path of the output current, and on resistance of the transistor is controlled so that the output current is limited to a predetermined current value.

According to the constant current circuit including such configuration, as shown in FIG. 1A, even if the ripple occurs in the output voltage VLED+ on the high potential side, ripple components can be removed from the output current by the change in the on resistance of the transistor for controlling the current. That is, by adding the ripple components with the same phase to the output voltage VLED− on the low potential side, the voltage between the output terminals becomes the predetermined voltage and the output current in which the ripple is removed can be supplied to the light emitting diode as a load. In FIG. 1, Vf is forward direction voltage in the light emitting diode, and Va is voltage between source-GND (ground point) in the transistor for controlling the current.

However, according to the above configuration, depending on the setting of the current value limited by the constant current circuit, the loss caused by the transistor for controlling the current may become large or the suppressing of the ripple in the output current may be insufficient. For example, if a high limiting current value is set compared to the optimal setting of the current value in FIG. 1A, excess loss occurs in the transistor for controlling the electric current only in the voltage drop Vb as shown in FIG. 1B.

If the setting of the current value limited by the constant current circuit is too low, for example, if a variation occurs in the power supplied from the input side, as shown in FIG. 1C, a term Tb in which the operation region of the transistor for controlling the electric current reaches the saturation region occurs. Therefore, the transistor for controlling the electric current cannot absorb the ripple voltage, and the suppressing of the ripple in the output current may not be sufficient. The current itself supplied to the light emitting diode is determined by the switching control on the primary side. Therefore, the electric current Iout flown in the light emitting diode is the same as FIG. 1A even if the setting value of limiting the current by the transistor for controlling the electric current is high as shown in FIG. 1B.

According to the constant current power supply apparatus shown in JP 2012-200118, the signal detected using the current detection resistor provided in the current path of the output current is fed back to the control circuit on the primary side of the DC/DC convertor to enable constant current control. Such constant current control is not performed for the purpose of suppressing ripples, and this is only typical constant current control. Therefore, if a higher harmonic wave suppressing function by a simple method is provided on the primary side, there is a problem that it is difficult to suppress ripples caused in the output current.

The present inventors have filed an application for a power supply apparatus which suppresses ripples occurring in the output current by providing a current control circuit including a current control element which is provided on a current path in which output current flows to control the current, an operational amplifier which generates voltage according to a potential difference between the current detection voltage which shows the size of the output current and the reference voltage to drive the current control element and a comparator which changes the reference voltage based on the output terminal voltage and the current detection voltage (JP 2018-211614).

However, according to the power supply apparatus of the above invention, if there is an offset in the comparator and the operational amplifier, the ripple component of the current detection voltage is hidden in the offset voltage, and it may not be possible to detect the ripple correctly. With this, it is clear that there are problems such as the ripple rate increasing or the ripples being suppressed excessively. Such problems tend to occur in regions where the ripple signal component is small (When the diming ratio is low in a lighting power supply apparatus).

SUMMARY

The present invention has been made in view of the above-described problems, and an object of the present invention is to provide a power supply apparatus, a semiconductor integrated circuit, and a ripple suppressing method, specifically, in the power supply apparatus which performs conversion to DC voltage to output a current to a load, even if the comparator and the operational amplifier included in the control circuit are offset, the ripple rate is not increased nor is the ripple suppressed excessively, and the ripple occurring in the output current can be suppressed.

In view of the above problems, according to an aspect of the present invention, a power supply apparatus includes, a voltage conversion circuit which generates DC voltage from an input power supply and which outputs the DC voltage between a pair of output terminals; a reference voltage generating circuit which generates an adjustable first reference voltage; a constant current control circuit which includes a current controller which is provided on a current path in which output current flows and which is controlled by voltage and a differential circuit which controls the current controller based on the first reference voltage and current detection voltage showing a size of the output current, and wherein an electric current on the current path is controlled by the current controller; and a reference voltage adjustment circuit which adjusts the first reference voltage generated by the reference voltage generating circuit to converge a ripple occurring in the output current to a predetermined ripple rate or less, based on a voltage of a first potential point set on the current path from an output portion on a high potential side of the voltage conversion circuit to the current controller and a control voltage of the current controller.

According to another aspect, a semiconductor integrated circuit which is provided in a power supply apparatus including a voltage conversion circuit which generates DC voltage from an input power supply and which outputs the DC voltage between a pair of output terminals, and the semiconductor integrated circuit drives a current controller which controls current in a current flow path in which output current flows, the semiconductor integrated circuit includes, a differential circuit which outputs a driving signal to the current controller to make a potential difference between a first reference voltage and the current detection voltage which shows the size of the output current to be small; and a reference voltage adjustment circuit which adjusts the first reference voltage to suppress a ripple occurring in the output current based on a voltage of a first potential point set on the current path from an output point on a high potential side of the voltage conversion circuit to the current controller and an output voltage of the differential circuit, wherein, the reference voltage adjustment circuit includes, a voltage holder which holds the first reference voltage, a pull up circuit which includes a first current supply and a first switch connected in series between a power supply voltage terminal and a voltage terminal of the voltage holder, and a first voltage comparator which compares a potential of an output point on a low potential side of the voltage converting circuit in the current path and a predetermined second reference voltage, wherein the first switch is controlled according to a comparison result of the first voltage comparator to pull up the first reference voltage, and a pull down circuit which includes a second current source and a second switch connected in series between the voltage terminal of the voltage holder and a reference potential point, and a second voltage comparator which compares the output voltage of the differential circuit with a predetermined third reference voltage, wherein the second switch is controlled according to a comparison result of the second voltage comparator to pull down the first reference voltage.

According to another aspect, a ripple suppressing method which drives a current controller which controls current in a current flow path in which output current flows to suppress a ripple occurring in the output current in a power supply apparatus including a voltage convertor which generates DC voltage from an input power supply and which outputs the DC voltage between a pair of output terminals, the method includes, generating an error amplifying signal between a current detection voltage which shows a size of the output current and a first reference voltage as a driving signal of the current controller; controlling a duration in which voltage of the driving signal of the current controller increases by adjusting a voltage value of the first reference voltage; and suppressing ripple current flowing in a load so that the ripple is a predetermined ripple current rate or lower.

BRIEF DESCRIPTION OF THE DRAWINGS

The accompanying drawings are not intended as a definition of the limits of the invention but illustrate embodiments of the invention, and together with the general description given above and the detailed description of the embodiments given below, serve to explain the principles of the invention, wherein:

FIG. 1A is a diagram showing a waveform when setting of the electric current is ideal, FIG. 1B is a diagram showing a waveform when the power controlled by the power supply apparatus increases and the output current increases compared to FIG. 1A, and FIG. 1C is a diagram showing a waveform when the power controlled by the power supply apparatus decreases and the output current decreases compared to FIG. 1A;

FIG. 5A and FIG. 5B show signal waveform diagrams which describe an operation of a constant current control circuit when (+) offset occurs according to the present embodiment, FIG. 5A is a waveform diagram when there are no measures for offset, and FIG. 5B is a waveform diagram when there are measures for offset;

FIG. 6A is a waveform diagram when there are no measures for offset, and FIG. 6B is a waveform diagram when there are measures for offset;

FIG. 7A and FIG. 7B show a simulation result when a sine wave is superimposed on an average current and a VREF terminal voltage is changed in a constant current control circuit shown in FIG. 8, FIG. 7A shows a change in ripple detection voltage, and FIG. 7B shows a change in VG voltage;

DETAILED DESCRIPTION OF EMBODIMENTS

Hereinafter, one or more embodiments of the present invention will be described with reference to the drawings. However, the scope of the present invention is not limited to the disclosed embodiments.

Figure 2:
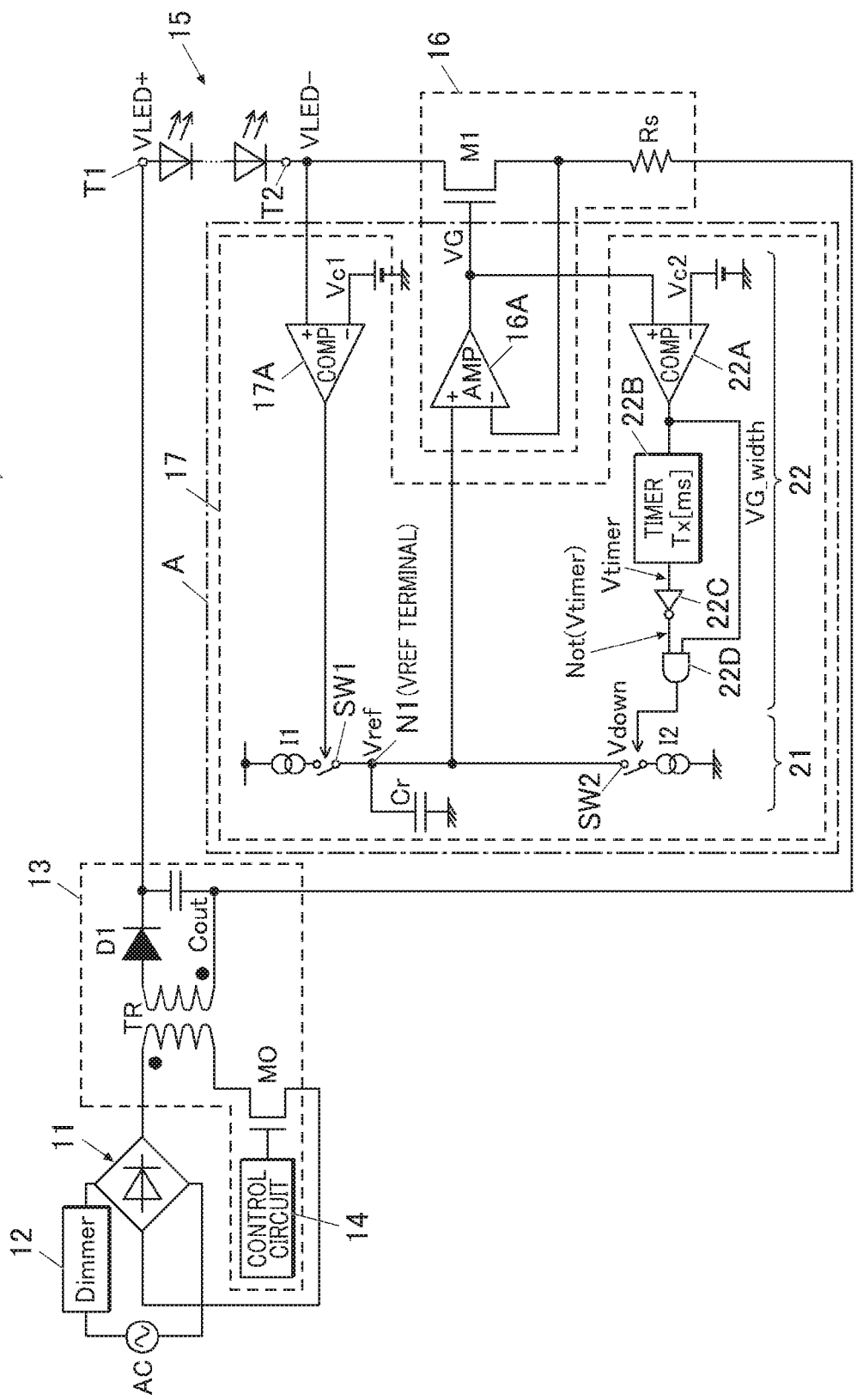
FIG. 2 is a circuit diagram showing a configuration of a power supply apparatus according to an embodiment of the present invention.

FIG. 2 is a circuit diagram showing a power supply apparatus according to an embodiment of the present invention. The power supply apparatus 10 according to the present embodiment includes a rectifier circuit 11 including a diode bridge which rectifies voltage of an AC power supply source and a dimming adjuster 12 which controls a phase dimmer such as a triac to adjust the brightness.

The power supply apparatus 10 includes an insulation type DC/DC convertor 13 which includes a transformer TR to convert voltage and which converts received output voltage of the rectifier circuit 11 to DC voltage, a constant current control circuit 16 which is provided in a current path of the output current Iout to limit the output current Iout to a target current, and a reference voltage adjustment circuit 17 which controls the current limited by the constant current control circuit 16. A light emitting diode column 15 for lighting is connected as a load between the output terminals T1 and T2 of the power supply apparatus 10.

The DC/DC convertor 13 includes a flyback type convertor including the transformer TR for the flyback convertor, a switching element M0 such as a field effect transistor connected to a primary side winding of the transformer TR, a primary side control circuit 14 which drives the switching element M0, a rectification diode D1 connected to a secondary side of the transformer TR, and an output capacitor Cout. The switching element M0 is turned on to accumulate energy in the primary side winding of the transformer TR and the energy is discharged from the secondary side winding of the transformer TR while the switching element M0 is off. With this, the output voltage of the rectifier circuit 11 is converted to the DC voltage.

The primary side control circuit 14 receives feedback of the signal corresponding to a voltage value or a current value detected from a detector (not shown) which is provided on the secondary side of the transformer TR to detect the output voltage or the output current, and controls the switching element M0 to maintain the above predetermined values. The primary side control circuit 14 includes a higher harmonic wave suppressing control function, and according to control of the switching element M0 by the primary side control circuit 14, the DC/DC convertor 13 operates to provide a higher harmonic wave suppressing effect on the voltage input to the primary side winding of the transformer TR. The higher harmonic wave suppressing function provided in the control circuit 14 can be realized by a control method the same as well-known higher harmonic wave suppressing methods such as a one convertor method or a constant on method.

The constant current control circuit 16 is provided in a current path of the output current Iout and limits the output current Iout to a target current. The constant current control circuit 16 includes a current controlling transistor M1 and a current detection resistance Rs connected in series in order from the output terminal T2 on the low potential side, an error amplifier 16A which controls a control terminal (gate terminal) of the transistor M1 based on the detection voltage detected by the current detection resistance Rs and a capacitor Cr which generates reference voltage. The constant current control circuit 16 operates like a constant current regulator.

The transistor M1 is, for example, a N channel MOSFET (insulation gate type field effect transistor) and the transistor M1 is provided on the current path of the output current Iout so that the output current Iout flows between the source and the drain. The transistor M1 changes the on resistance between the source and the drain by controlling the gate voltage and operates as a current control element which is able to control the drain current.

The current detection resistance Rs is connected between the reference potential on the secondary side (terminal on the low potential side of the output capacitor Cout) and the transistor M1. The current detection resistance Rs functions as a current-voltage converting element and detection voltage is output in accordance with the output current Iout in a connection point with the transistor M1. The capacitor Cr holds reference voltage Vref and supplies the above to a non-inverting input terminal of the error amplifier 16A.

The detection voltage of the current detection resistance Rs is input to the inverted input terminal and the error amplifier 16A outputs the voltage in accordance with the potential difference between the detection voltage and the reference voltage Vref to the control terminal of the transistor M1. When the reference voltage Vref is target current Ia×(resistance value of resistance Rs), if the current flowing in the resistance Rs becomes larger than the target current Ia, the output voltage of the error amplifier 16A input in the control terminal of the transistor M1 is controlled so that the on resistance of the transistor M1 becomes large. With this, the output current Iout becomes small.

If the current flowing in the resistance Rs becomes smaller than the target current Ia, the output voltage of the error amplifier 16A input in the gate terminal as the control terminal of the current controlling transistor M1 is changed so that the on resistance of the transistor M1 becomes small. With this, the output current Iout becomes large. According to the operation as described above, the output current Iout is controlled to be converged to the target current Ia.

The reference voltage adjustment circuit 17 includes a reference voltage generation circuit 21 including two constant current sources I1 and I2 and two switches SW1 and SW2 connected in series between a power supply voltage terminal and a grounding point. The capacitor Cr is connected between the connection node N1 of the switches SW1 and SW2 and the grounding point.

The reference voltage adjustment circuit 17 includes a first comparator 17A which changes the output to high level when the voltage VLED− of the output terminal on the low potential side and the predetermined reference voltage Vc1 are compared and the VLED− is higher than the Vc1, and a down signal generation circuit 22 which includes a second comparator 22A which changes the output to high level when the output voltage VG of the error amplifier 16A is compared with the predetermined reference voltage Vc2 and VG is higher than Vc2. The reference voltage adjustment circuit 17 charges and discharges the capacitor Cr which holds the above reference voltage Vref and changes the reference voltage Vref. The connection node N1 connecting the switches SW1 and SW2 with the capacitor Cr corresponds to the VREF terminal.

The reference voltage Vc1 is set in advance to a voltage value higher than the output voltage VLED− when the ripple of the output current Iout becomes zero. The reference voltage Vc1 is set to a value smaller than a predetermined voltage value. For example, when the output power of the DC/DC convertor 13 can be switched by the dimming function, the output voltage VLED− increases right after the output power is largely switched. In this case, the reference voltage Vc1 is set to a value smaller than the increased voltage value.

According to the above setting, when switched to a direction that the output power increases such as by starting (AC power on) or dimming function, and the output voltage VLED− becomes higher than the reference voltage Vc1, the first comparator 17A operates to switch the switch SW1 to on. The reference voltage Vc2 is set to a potential between a high level and a low level of an output voltage VG (see FIG. 4(B)) of the error amplifier 16A input in the gate terminal of the current controlling transistor M1.

In the power supply apparatus 10 according to the present embodiment, the pull up ability of the voltage of the constant current source I1 is set to be higher (for example, higher two times or more) than the pull down ability of the voltage of the constant current I2. That is, in a predetermined unit of time, the inflow of the current of the constant current source I1 is larger than the outflow of the current of the constant current source I2. With this, the increase amount of the reference voltage Vref when the switch SW1 is on is large, and the decrease amount of the reference voltage Vref when the switch SW2 is on is small.

It is assumed that in the power supply apparatus 10 shown in FIG. 2, the output power of the DC/DC convertor 13 is switched to a large value due to starting or a dimming function. The output ability of the DC/DC converter 13 becomes large with relation to the current amount (reference voltage Vref) flown by the transistor M1, and the output voltage VLED− increases. The first comparator 17A compares the output voltage VLED− with the reference voltage Vc1, and when the output voltage VLED− exceeds the reference voltage Vc1, the output of the first comparator 17A becomes high level. With this, the first current supply I1 pulls up the reference voltage Vref. With this pull up, the state of the power supply apparatus 10 switches from the state of the range H2 shown in FIG. 3 to the state of the range H1 (state in which ripples occur in the output current Iout). The ability of the first current source I1 is large at this time, and the pull up of the reference voltage Vre can be performed swiftly.

When the reference voltage Vref becomes large in response to the output of the DC/DC converter 13, and the current amount which the transistor M1 can flow becomes large with respect to the output abilities of the DC/DC convertor 13, ripples occur in the output current Iout and the source voltage V_MOS_S. The second comparator 22A compares the gate voltage VG of the error amplifier 16A with the reference voltage Vc2. If the gate voltage VG of the error amplifier 16A exceeds the reference voltage Vc2, the output of the second comparator 22A becomes high-level, and the second current source I2 pulls out the load from the capacitor Cr to gradually reduce the reference voltage Vref.

In the power supply apparatus 10 according to the present embodiment, the ability of the first current source I1 is set higher than the ability of the second current source I2. Therefore, if the output ability is increased when the power supply apparatus 10 is started or by the dimming function, the reference voltage Vref can be increased immediately. If the ripple of the output current Iout is converged to a suppressed range, the reference voltage Vref can be gradually decreased and the reference voltage Vref can be adjusted to a suitable value.

If the output voltage VG of the error amplifier 16A is higher than the reference voltage Vc2 and predetermined conditions are satisfied, the down signal generating circuit 22 turns on the switch SW2 and discharges the capacitor Cr with the current of the constant current source I2 to pull down the reference voltage Vref.

Specifically, the down signal generating circuit 22 includes a timer circuit 22B which starts keeping time in response to the output of the second comparator 22A changing to high-level, an inverter 22C which inverts output of the timer circuit 22B, and an AND gate 22D to obtain a logical product between the output of the inverter 22C and the output of the second comparator 22A. The timer circuit 22B may be an analog circuit including a constant current source and a capacitor or may be a digital circuit such as a counter circuit which counts the clock signal.

The timer circuit 22B starts counting the time at the same time as the output changing to high-level, and if the timer circuit 22B counts a predetermined duration set in advance, the output changes to low-level. With this, in the down signal generating circuit 22, if the term that the output of the second comparator 22A is high-level is longer than the predetermined duration counted by the timer circuit 22B, the output of the AND gate 22D changes to high-level for the duration that the term of high-level is longer, the switch SW2 is switched to on, and the capacitor Cr is discharged with the current of the constant current source I2 to pull down the reference voltage Vref.

Although not limited, in the power supply apparatus 10 shown in FIG. 2, a circuit element in the range surrounded by the alternate long and short dash line A (element composing the reference voltage adjustment circuit 17 and the error amplifier 16A) is formed as a semiconductor integrated circuit (IC) on one semiconductor substrate (semiconductor chip). The current controlling transistor M1 is connected to the semiconductor integrated circuit as an external element but may be provided in the semiconductor chip. The capacitor Cr is provided as an element in the semiconductor chip but may be connected to the semiconductor integrated circuit as an external element.

<Operation Description>

According to the power supply apparatus 10 shown in FIG. 2, the higher harmonic wave is suppressed in the DC/DC converter 13. Therefore, ripples depending on the frequency of the AC power supply occur in the output VLED+ converted by the DC/DC converter 13. The output current Iout of the power supply apparatus 10 is controlled to the target current by the constant current control circuit 16. Therefore, normally, ripples with the same phase and the same size occur in the output voltage VLED− of the low potential side and the ripples are removed from the output current Iout flowing in the load.

Figure 3:
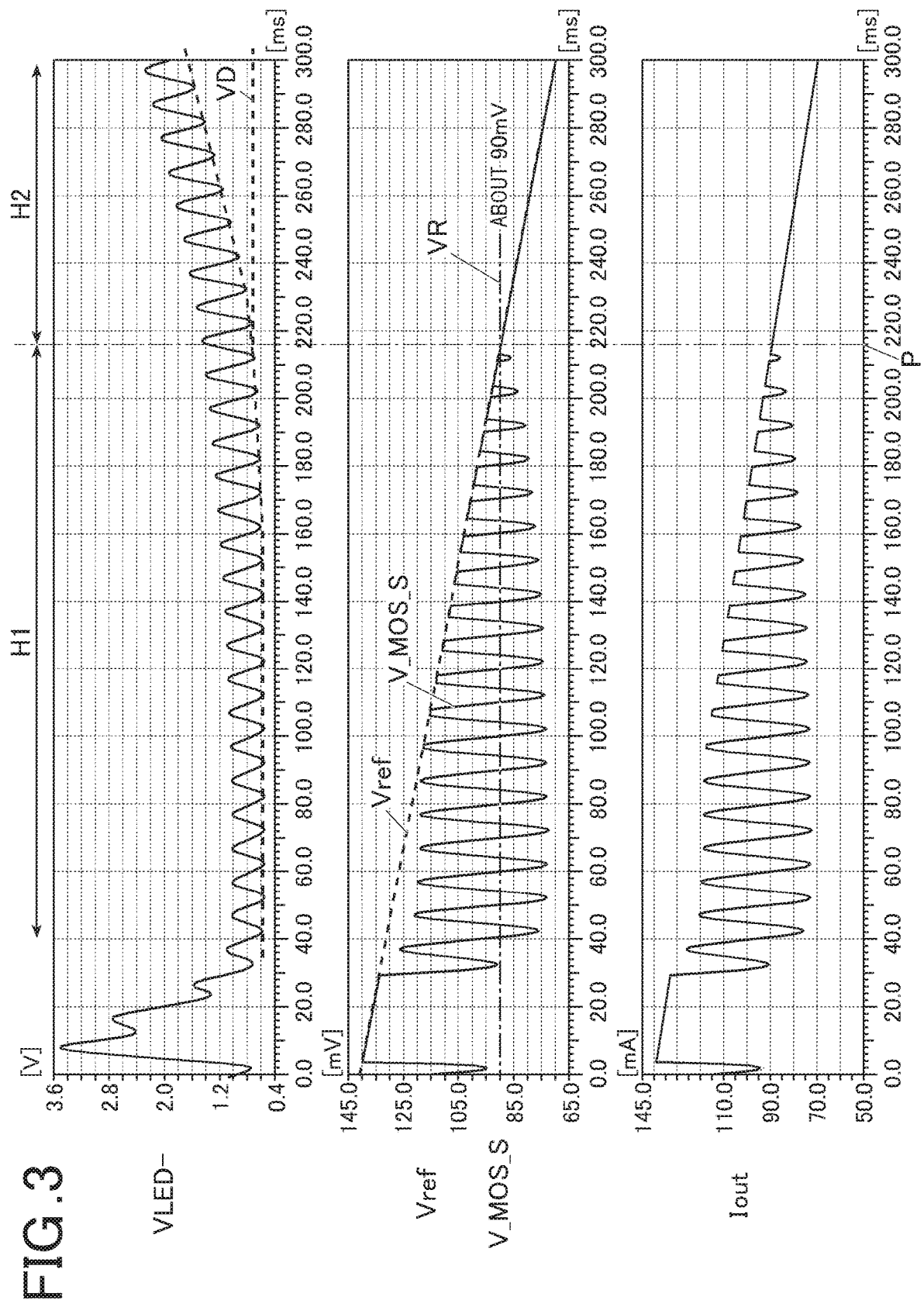
FIG. 3 is a signal waveform describing an operation of a power supply apparatus when the current value of a constant current control circuit changes according to the present embodiment.

FIG. 3 shows a signal waveform which describes the operation of the power supply apparatus when the reference voltage Vref is changed to change the current value controlled by the constant current circuit in the state with the operation of the reference voltage adjustment circuit 17 in the power supply apparatus 10 shown in FIG. 2 stopped. In FIG. 3, "VLED−" shows the output voltage of the output terminal T2 on the low potential side, "Vref" shows the reference voltage Vref of the error amplifier 16A, "V_MOS_S" shows the source voltage of the transistor M1, and "Iout" shows the output current. In FIG. 3, the horizontal axis shows time and FIG. 3 shows the waveform when the electric current of the constant current control circuit 16 decreases at a predetermined rate.

First, the voltage and the current of the connection points in the power supply apparatus 10 is described when the reference voltage Vref of the constant current control circuit 16 is decreased to a predetermined speed with the control of the reference voltage adjustment circuit 17 omitted.

Figure 1A:
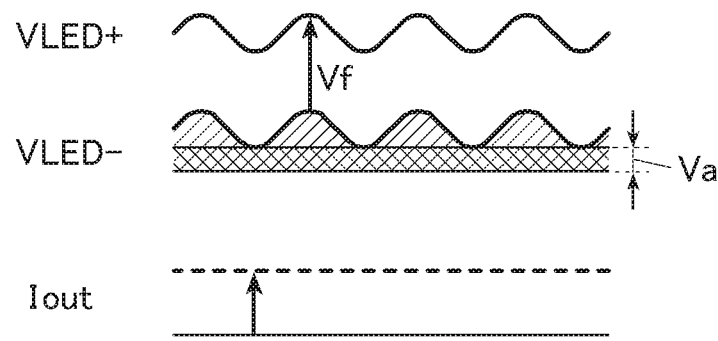
FIG. 1A to FIG. 1C show output characteristics of a power supply apparatus in which a constant current circuit is provided in a current path of an output current.

In the case as shown in the range H1 in FIG. 3, in the range in which the reference voltage Vref is higher than the voltage VR corresponding to the balanced voltage VD (minimum voltage of the ripple bottom voltage of VLED− in the range in which the ripples of the output current Iout are suppressed) the ripples occurring in the output voltage VLED− on the low potential side are small and the ratio of the change in the bottom voltage of the ripple of the output VLED− with relation to the change of the reference voltage Vref becomes small. In the range H1, there is a term Tb (see FIG. 1C) in which the operation region of the current controlling transistor M1 reaches the saturation region. Therefore, the transistor M1 cannot control the current in the portion of the valley of the ripples to the target current, and the ripples occur in the output current Iout.

As shown in the range H2 shown in FIG. 3, in the range in which the reference voltage Vref is lower than the voltage VR, the bottom voltage of the ripple occurring in the output voltage VLED− on the low potential side in response to the change in the reference voltage Vref increases in a comparatively high percentage. The increase of the bottom voltage corresponds to the loss occurring in the transistor M1. In the range H2, the current controlling transistor M1 can control the current to operate in the non-saturation region to the target current in the entire term. Therefore, the ripples do not occur in the output current Iout.

From the characteristics shown in FIG. 3, the most suitable setting for the target current of the constant current control circuit 16 is the range H2 in which the ripples of the output current Iout do not occur, and this is the setting in which the bottom voltage of the ripples occurring in the output voltage VLED− on the low potential side becomes the lowest balanced voltage VD. In the setting in which the bottom voltage becomes the balanced voltage VD, the loss which occurs in the transistor M becomes the smallest in the range in which the ripples are removed from the output current Iout. Such balanced voltage VD is in the boundary where a slope showing the ratio of the change of the bottom voltage with relation to the change of the target current changes from a comparatively large slope to a small slope close to zero.

The reference voltage adjustment circuit 17 uses the characteristic shown in FIG. 3 and controls the target current of the constant current control circuit 16, that is, the reference voltage Vref so that the bottom voltage of the ripple in the output voltage VLED− on the low potential side becomes closer to the balanced voltage VD.

For example, if the value of the reference voltage Vref is within the range H2 shown in FIG. 3, the switch SW1 is turned on by the output of the comparator 17A, the capacitor Cr is charged by the current of the current source I1, the reference voltage Vref increases, and the bottom voltage changes in the direction closer to the balanced voltage VD.

On the other hand, if the value of the reference voltage Vref is within the range H1 shown in FIG. 3, the switch SW2 is turned on by the output of the comparator 22A, the capacitor Cr is discharged by the current of the current supply I2, the reference voltage Vref decreases, and the bottom voltage of the ripple changes in the direction closer to the balanced voltage VD.

Specifically, if the ripple slightly remains (for example, the ripple remains within 5%) in the range in which the output current Iout is suppressed, the control of the transistor M1 is fixed. With this, the state of the power supply apparatus 10 is controlled to be converged near the boundary (balance point P) between the range H1 and the range H2 shown in FIG. 3. That is, for example, the bottom voltage of the output voltage VLED− is converged near the balanced voltage VD which is the minimum voltage in the range in which the ripple of the output current Iout is suppressed within 5%.

As described above, according to the power supply apparatus 10 and the ripple suppressing method of the present embodiment, DC voltage is generated from the AC power supply AC while suppressing the higher harmonic waves. Therefore, even if ripples occur in the converted DC voltage, the ripples in the output current Iout output to the load can be sufficiently suppressed by the control of the constant current control circuit 16. With this, it is possible to suppress flickering occurring in the lighting of the light emitting diode column 15 or noise such as stripes appearing on the screen in imaging by the digital camera even if the flickering cannot be confirmed by human eyes.

According to the power supply apparatus 10 and the ripple suppressing method of the present embodiment, the bottom voltage in the output voltage VLED− on the low potential side is controlled to be converged to the balanced voltage VD by the constant current control circuit 16 and the reference voltage adjustment circuit 17. With this, the ripples of the output current Iout can be suppressed and the loss occurring in the transistor M1 of the constant current control circuit 16 can be decreased.

Figure 1B:
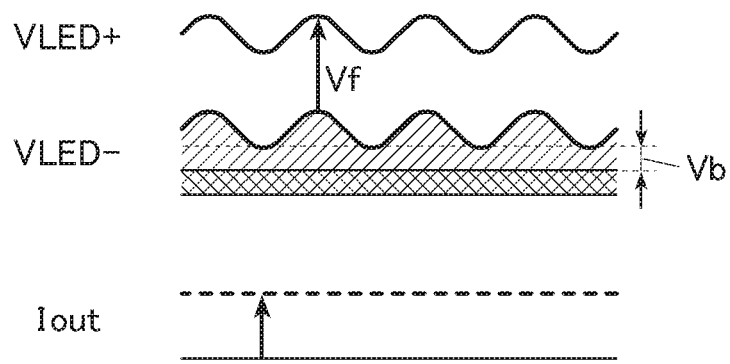
Figure 1C:
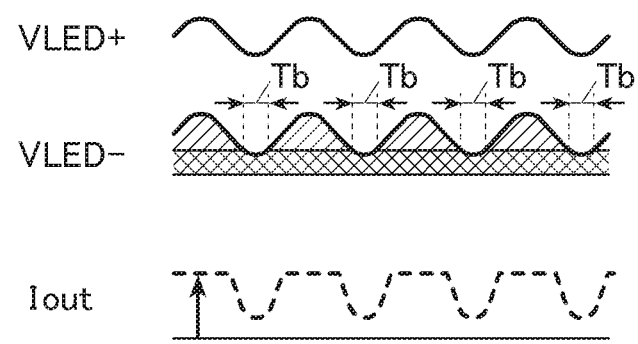

For example, as a comparative example, in a configuration in which the target current of the constant current control circuit 16 is the predetermined current, an error occurs in the DC/DC converter 13 and the output power becomes large. In this case, as shown in FIG. 1B, the transistor M1 of the constant current control circuit 16 is controlled so that the voltage decrease amount becomes large, and the target current of the constant current control circuit 16 is maintained. In this case, loss of the voltage decrease Vb occurs in the transistor M1.

However, even if such error occurs, according to the power supply apparatus 10 of the present embodiment, the reference voltage adjustment circuit 17 changes the reference voltage Vref so that the target current of the constant current control circuit 16 becomes large, and converges the bottom voltage of the output voltage VLED− to the balanced voltage VD. With this, in the constant current control circuit 16, the on resistance of the transistor M1 is controlled to be low so that the output current Iout becomes large, and the loss occurring in the constant current control circuit 16 decreases. The forward direction voltage Vf of the light emitting diode column 15 changes slightly in response to the current value. Therefore, if the output current Iout increases, the voltage falling in the light emitting diode column 15 increases. Therefore, if the on resistance of the transistor M1 decreases, as shown in FIG. 1A, operation in which the loss occurring in the constant current control circuit 16 becomes small is achieved.

As a comparative example, in a configuration in which the target current of the constant current control circuit 16 is constant, an error occurs in the DC/DC converter 13 and the output power becomes small. In this case, as shown in FIG.

1C, if control is performed to match the predetermined target current, the term Tb in which the transistor M1 of the constant current control circuit 16 operates in the saturation region occurs and the ripple in the output current Iout occurs.

However, in such case, according to the power supply apparatus 10 of the present embodiment, the reference voltage adjustment circuit 17 changes the reference voltage Vref so that the target current of the constant current control circuit 16 becomes small, and the bottom voltage of the ripple in the voltage "VLED−" of the output terminal T2 is converged near the balanced voltage VD. With this, the on resistance in the transistor M1 of the constant current control circuit 16 is controlled so that the output current Iout becomes small, and the term Tb in which the transistor M1 operates in the saturation region is cut.

Therefore, even if the ripples are included in the current output to the light emitting diode column 15, the ripples are suppressed to the level such as flickering not being caught when imaged by a digital camera in an environment in which light emitting diode is used as lighting. Then, even in such case, if the output power of the DC/DC converter 13 is not reduced to the level in which the load cannot be driven, the light emitting diode column 15 can be driven normally in the state in which the ripples of the output current Iout are suppressed.

Figure 4:
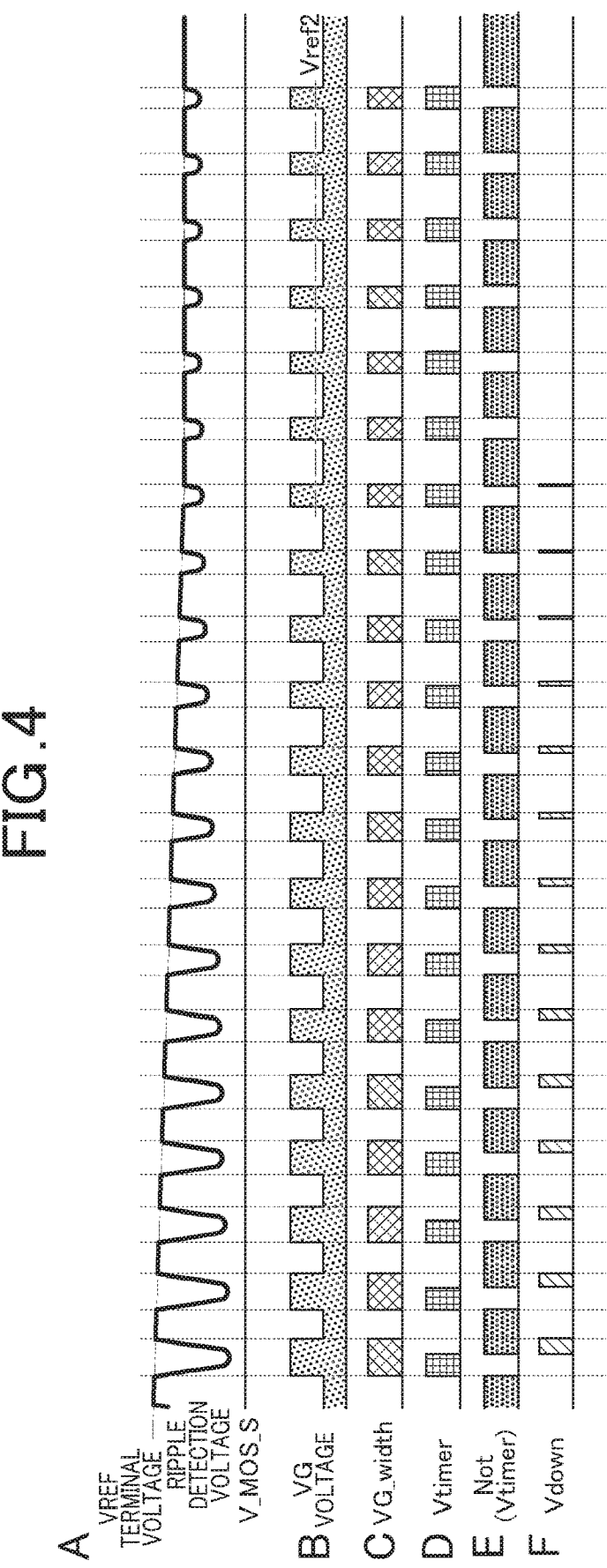
FIG. 4 is a signal waveform describing an operation of a constant current control circuit when there is no offset according to the present embodiment.

FIG. 4 shows the change in the potential in the points inside the circuit when the ripples are controlled and suppressed according to the present embodiment. FIG. 4 shows the following, (A) the detection voltage of the output current input to the reference voltage Vref and the error amplifier 16A, that is, the source voltage V_MOS_S in the current controlling transistor M1, (B) the gate voltage VG in the current controlling transistor M1, (C) pulse width in the gate voltage VG, (D) output of the timer circuit 22B, (E) output of the inverter 22C, and (F) change in the down signal Vdown output from the AND gate 22D.

As shown in FIG. 4, according to the power supply apparatus of the present embodiment, if the ripples are large, the down signal Vdown which has a large pulse width is generated, and with this, the reference voltage Vref decreases, the pulse width of the gate voltage VG becomes gradually smaller, and the ripple included in the detection voltage converges within the range equal to or less than the predetermined ripple rate (for example, 5%). Here, the ripple rate is a value shown by ((clamp voltage-bottom)/clamp voltage)×100.

The example above describes the operation when the error amplifier 16A included in the constant current control circuit 16 and the comparators 17A and 22A included in the reference voltage adjustment circuit 17 do not include offset. Next, the example in which the error amplifier 16A and the comparators 17A and 22A include offset is described.

According to the power supply apparatus of the sixth embodiment in the prior art (JP 2018-211614) filed by the present inventors, the employed method detected ripples included in the output current by the comparator corresponding to the comparator 22A of the present invention monitoring the source voltage of the current controlling transistor M1. Therefore, if there is offset in the comparator and the error amplifier, the ripple component of the current detection voltage is buried in the offset voltage, and there are problems such as cases in which ripples are not detected correctly or the ripple rate increasing or the ripples being suppressed excessively.

The present invention focuses on the point that the largest amplitude in the signal including the information of the ripple is the gate control voltage VG of the current controlling transistor M1 and the amplitude of the VG voltage becomes high when the ripples occur. According to the present invention, the VG voltage is monitored to detect the ripples and control is performed so that the time that the VG voltage becomes high is a predetermined value or less. With this, for example, the ripples are suppressed to a range 5% or less. According to this method, the time that the VG voltage is high is a predetermined value or less. With this, the ripple rate can be controlled to be converged to a predetermined value (for example, 5% or less).

As in the power supply apparatus 10 shown in FIG. 1 according to the present embodiment, in the constant current control circuit 16 provided with the error amplifier 16A with the detection voltage of the output current as the input, the preferable operation is, as shown in FIG. 4, the operation in which the flat portions of the VREF terminal voltage (Vref) and the ripple detection voltage overlap. If the offset voltage occurs in the error amplifier 16A, as shown in FIG. 5A, FIG. 5B, FIG. 6A and FIG. 6B, an error occurs in the voltage in the (+) direction or the (−) direction. As a result, as in the prior art (JP 2018-211614), if there are no measures regarding the offset, the balance point (point P in FIG. 3) of the output current Iout may be shifted from the point where the circuit actually converges.

Specifically, in the state in which the ripples occur in the LED current (output current Iout), the gate control voltage VG of the current controlling transistor M1 becomes high compared to the region in which the ripples do not occur. If the offset is added in the (+) direction, the width of the ripples becomes wider, the ripple rate increases, and as shown in FIG. 5A, converging to the desired ripple rate or less can be suppressed.

On the other hand, according to the power supply apparatus 10 of the present embodiment in which the circuit (timer 22B, AND gate 22D, etc.) for handling the offset is provided, as shown in FIG. 5B, the width of the VG voltage immediately becomes narrow, and the ripples included in the LED current become small so as to be able to converge to a desired ripple rate or less.

If no measures are taken to handle the offset occurring in the (−) direction in the error amplifier 16A, even if the ripples are included in the LED current (output current Iout), the ripples cannot be detected in the error amplifier 16A. As in the term Tc shown in FIG. 6A, the VG voltage does not become high and becomes too narrow. The ripples do not occur in such state. However, the capacitor Cout may be charged by the current which cannot flow in the transistor M1 and the LED (+) voltage and LED (−) voltage may increase to cause the overvoltage. That is, the circuit may not operate normally.

Figure 6A:
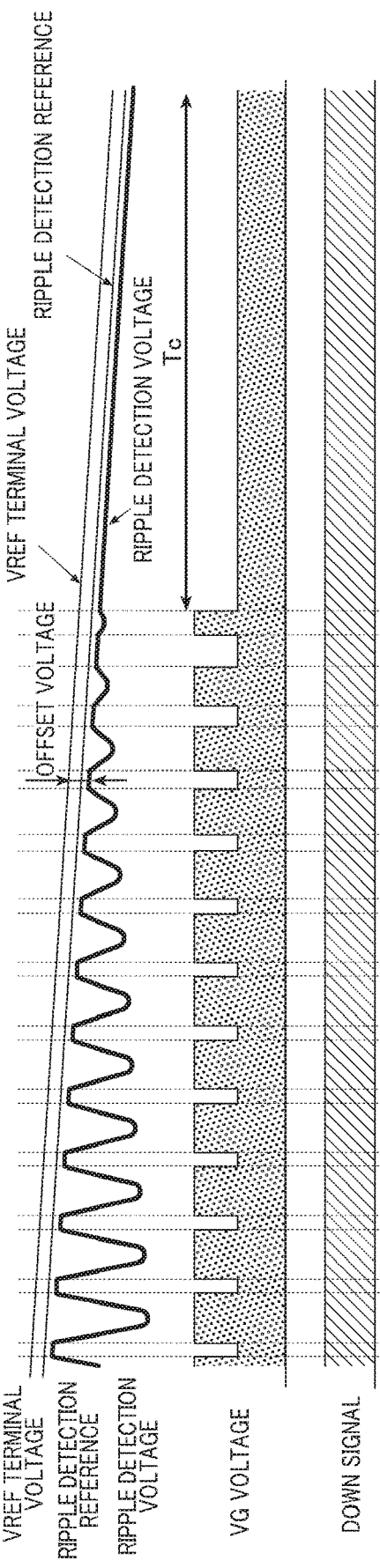
FIG. 6A and FIG. 6B show signal waveform diagrams which describe an operation of a constant current control circuit when (−) offset occurs according to the present embodiment.
Figure 6B:
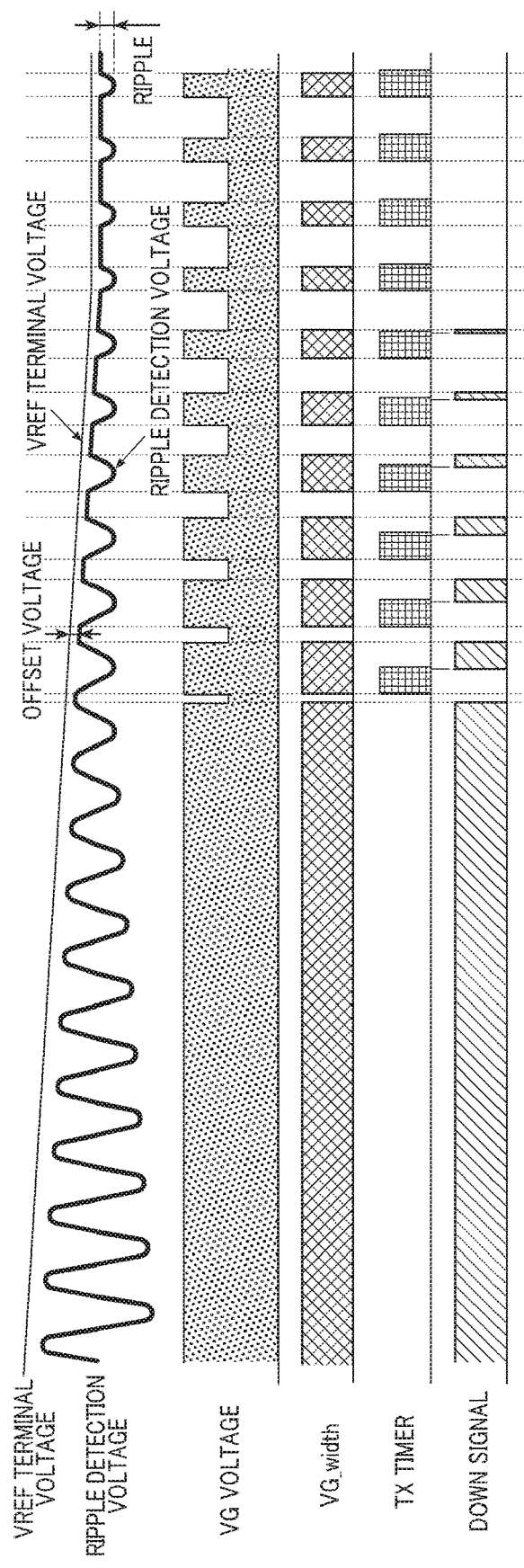

On the other hand, in the power supply apparatus 10 in which the offset measures are taken as in the present embodiment, as shown in FIG. 6B, the width of the VG voltage can be controlled to be a predetermined value or less, the state of being too narrow does not occur and convergence is achieved at a desired ripple rate or less.

Next, the relation between the ripple rate in the power supply apparatus according to the present embodiment and the term (VG width) in which the VG voltage which is the gate control voltage of the current controlling transistor M1 becomes high is described.

Figure 8:
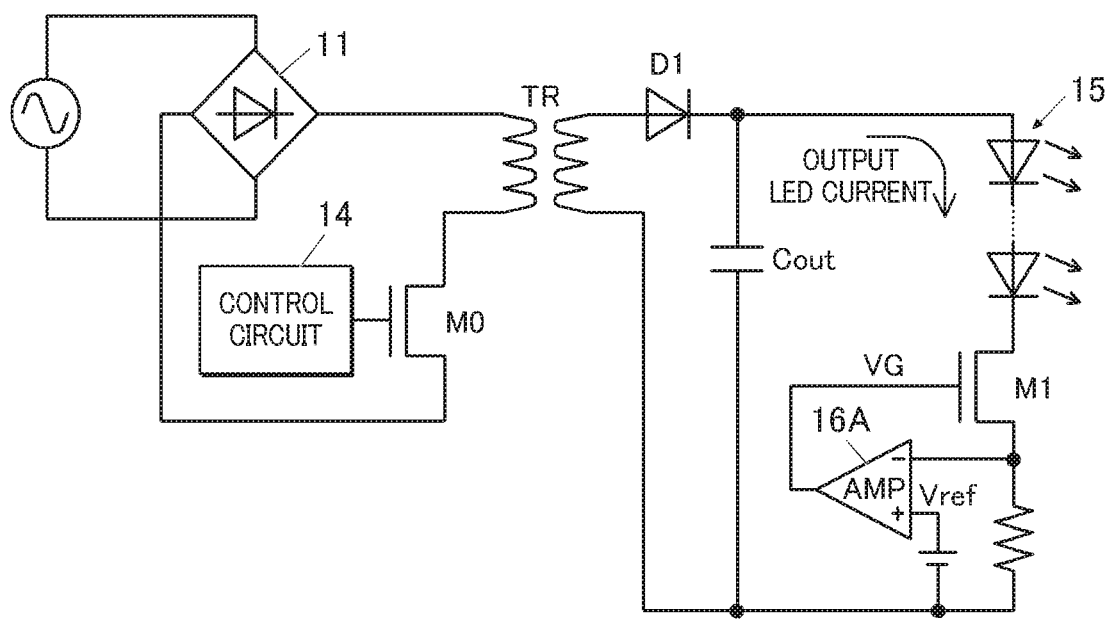
FIG. 8 is a circuit diagram showing a configuration of a constant current control circuit according to the simulation.

FIG. 7A and FIG. 7B describe a simulation result in the constant current control circuit with the configuration as shown in FIG. 8 when the sine wave with the amplitude of about 80 mV is superimposed as the ripple on the LED current with the average current as 500 mA and the VREF terminal voltage (VREF) is changed. Here, FIG. 7A shows the change in the ripple detection voltage, that is, the source voltage V_MOS_S of the current controlling transistor M1 and FIG. 7B shows the change of the VG which is the gate control voltage. Here, the current detection resistance Rs is set to 0.1Ω.

The waveform S0 shown in FIG. 7A is a waveform of the LED current in which the sine wave is superimposed in a state without constant current control. The waveforms S1 to S6 shown in FIG. 7A are waveforms of the LED current when constant current control is applied to change the VREF terminal voltages (Vref) to 70 mV, 65 mV, 60 mV, 55 mV, 51 mV, and 50.1 mV. For example, when Vref is 70 mV, as shown in the waveform S1, the ripple detection voltage is clamped to 70 mV.

When the constant current control is performed, the average current is maintained at 500 mA, the amount of the scraped mountain of the sine wave fills the valley, and the bottom of the sine wave is raised. The phenomenon of the rising bottom means the ripples become small. It is possible to understand from FIG. 7B that the VG voltage is high in the valley portion of the waveform in the LED current, and the term (VG width) Ts1 to Ts6 in which the VG voltage becomes high becomes narrow as the valley becomes shallow.

The current apparatus according to the present embodiment uses the characteristic as described above and employs the configuration as shown in FIG. 2 (reference voltage adjustment circuit 17). By changing the VREF terminal voltage (Vref), the ripples become small. In the configuration of the reference voltage adjustment circuit 17 shown in FIG. 2, when the offset voltage occurs in the error amplifier 16A, the reference voltage Vref is changed so that the VG width is gradually narrowed to a predetermined width, and the ripple rate can be converged to a predetermined value or less.

Figure 9:
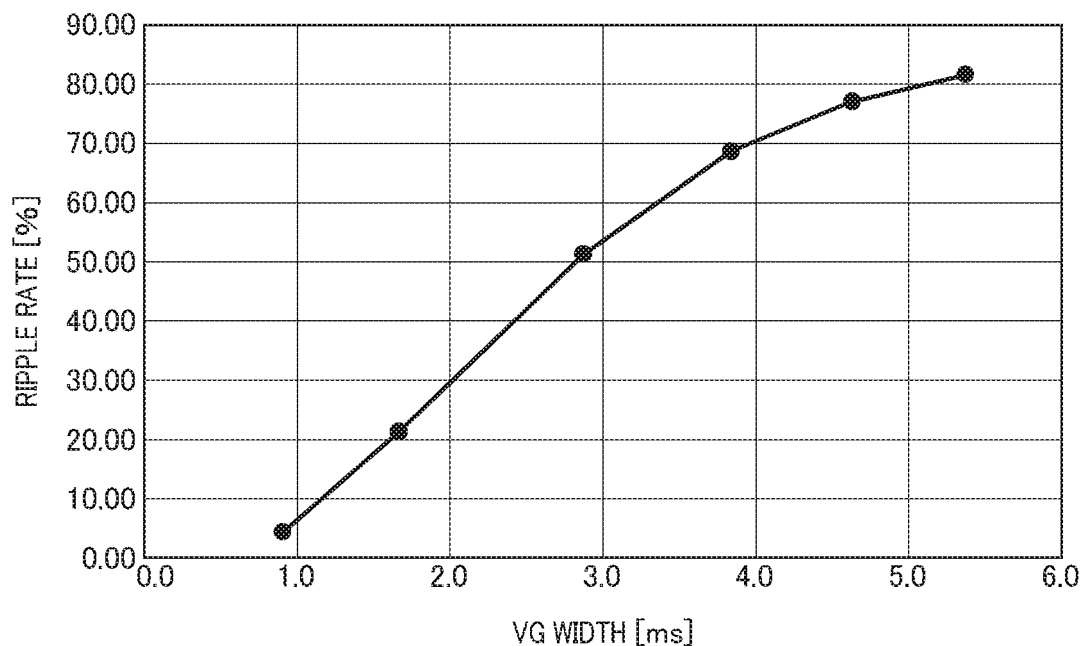
FIG. 9 is a graph showing a relation between the VG voltage and the ripple rate based on the simulation result.

The following table 1 shows the relation between the VREF terminal voltage, the bottom voltage of the LED current, the ripple rate, and the VG width obtained by the simulation result. FIG. 9 shows a graph showing the relation between the ripple rate and the VG width among the above parameters.

TABLE 1

| VREF VOLTAGE [V] | BOTTOM VOLTAGE [V] | RIPPLE RATE [%] | VG WIDTH [ms] |
|---|---|---|---|
| 70 | 12.83 | 81.67 | 5.37 |
| 65 | 15.00 | 76.92 | 4.63 |
| 60 | 18.86 | 68.57 | 3.83 |
| 55 | 26.70 | 51.45 | 2.87 |
| 51 | 40.15 | 21.27 | 1.66 |
| 50.1 | 47.89 | 4.41 | 0.90 |

It can be understood from table 1 and FIG. 9 that if the VG width is set to 0.9 ms (millisecond), the ripple rate can be suppressed to 4.4% or less. According to the current apparatus shown in the above embodiment (FIG. 1), first the ripple rate to be converged is determined, the VG width corresponding to the determined ripple rate is read using FIG. 9, and the measured time Tx by the timer circuit 22B is determined to be the VG width.

(Modification)

Next, the modification of the power apparatus according to the present embodiment is described with reference to FIG. 10 to FIG. 13.

Figure 10:
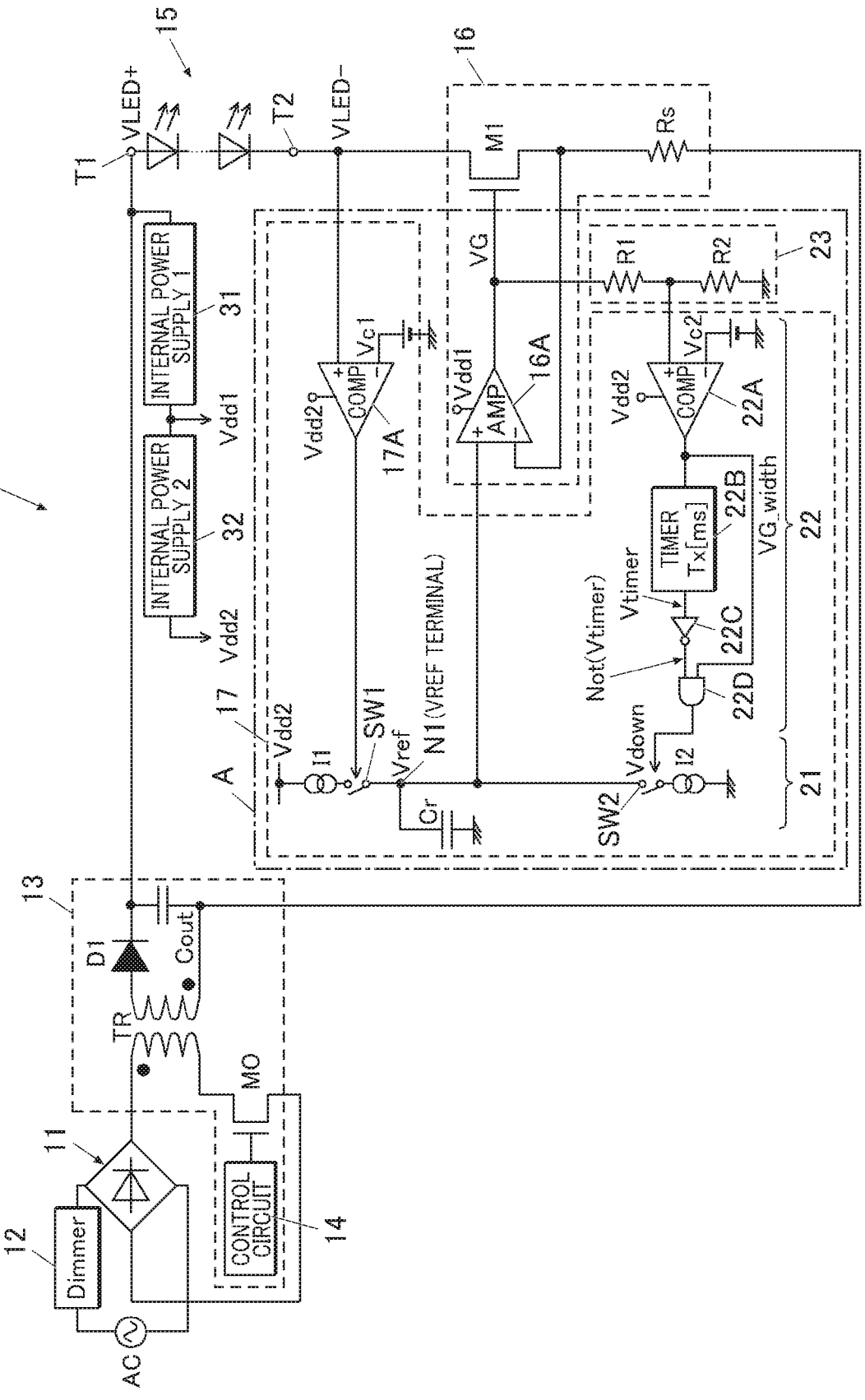
FIG. 10 is a circuit configuration diagram showing a first modification of the power supply apparatus according to the present embodiment.

Among the above, FIG. 10 is a circuit configuration diagram showing the first modification of the power supply apparatus according to the present embodiment.

As shown in FIG. 10, in the power supply apparatus according to the first modification, the semiconductor integrated circuit (IC) in which the reference voltage adjustment circuit 17 is formed is provided with a first internal power supply circuit 31 in which input is to be the voltage VLED+ of the output terminal on the high potential side and which generates the operation voltage Vdd1 of the error amplifier 16A included in the constant current control circuit 16 (for example, +10V) and a second internal power supply circuit 32 in which input is to be the voltage Vdd1 generated by the first internal power supply circuit 31 and which generates the operation voltage Vdd2 (for example, +5V) for the circuit other than the error amplifier 16A. For example, each of the first internal power supply circuit 31 and the second internal power supply circuit 32 can be configured as a series regulator.

According to the present modification, a voltage divider circuit 23 including the resistors R1 and R2 is provided between the output terminal of the error amplifier 16A (gate terminal of M1) and the grounding point. The resistors R1 and R2 divide the gate voltage VG of the transistor M1 as the output of the error amplifier 16A, and the divided voltage is input to the comparator 22A of the reference voltage adjustment circuit 17.

According to the above configuration, as described above, even if the operation voltage Vdd1 of the error amplifier 16A and the operation voltage Vdd2 of the circuit other than the error amplifier 16A are different, the above-described control method can be used to make the ripples included in the output current Iout small, to make the output current Iout closer to the balance point P, and to converge the ripple rate to the predetermined value or less.

The high voltage Vdd1 (+10V) generated by the first internal power supply circuit 41 is supplied to the error amplifier 16A as the operation voltage. With this, the amplitude of the output voltage of the error amplifier 16A can be increased so as to be able to enlarge the gate voltage control range of the current controlling transistor M1.

In the circuit other than the error amplifier 16A, the low voltage Vdd2 (+5V) generated by the second internal power supply circuit 42 is supplied as the operation voltage. With this, the current consumption of the IC can be reduced, and there is no need to use the element with high breakdown voltage as the element included in the circuit other than the error amplifier 16A. Therefore, the chip size can be reduced.

Figure 11:
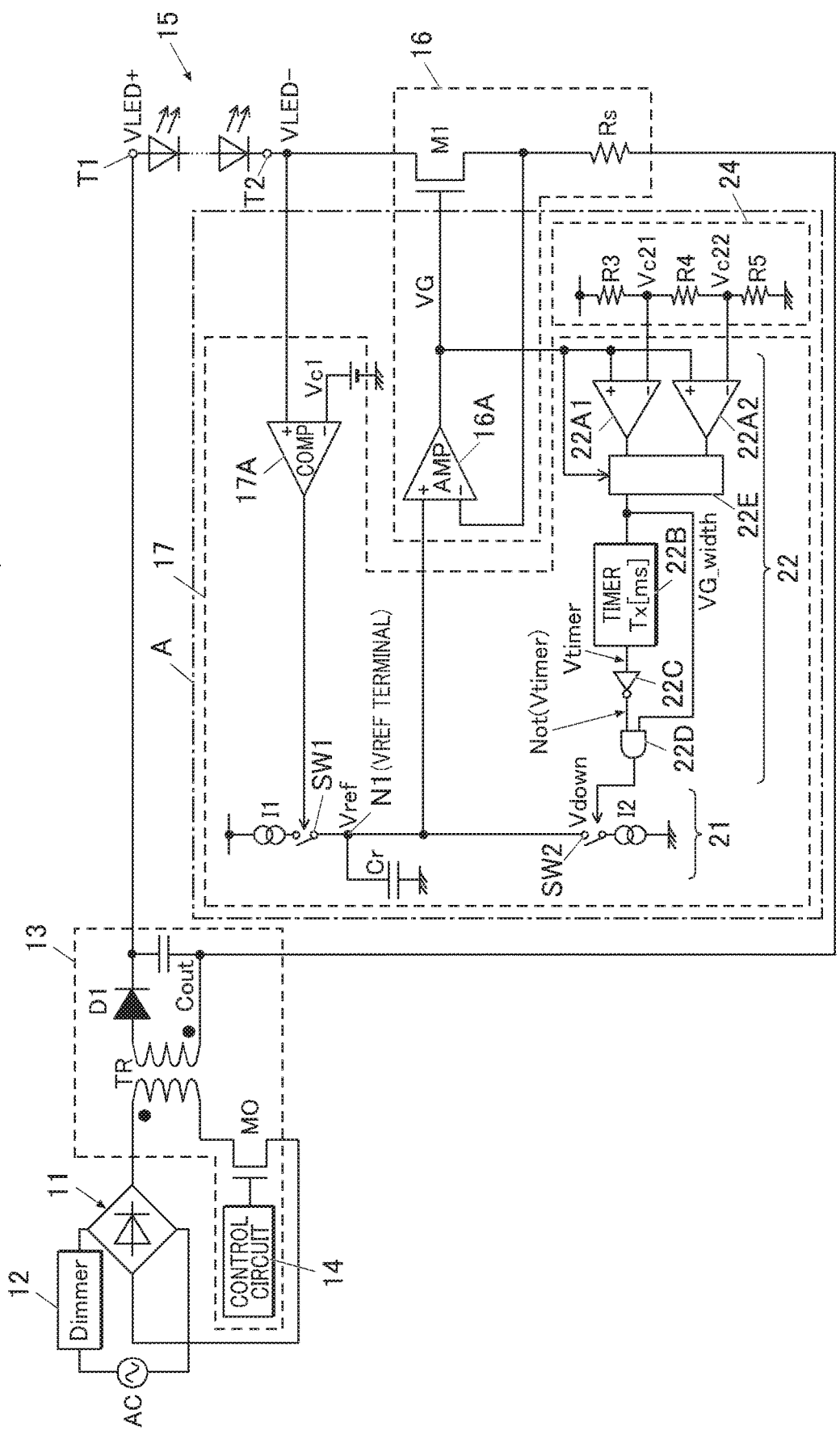
FIG. 11 is a circuit configuration diagram showing a second modification of the power supply apparatus according to the present embodiment.

FIG. 11 is a circuit configuration diagram showing a second modification of the power supply apparatus according to the present embodiment.

The power supply apparatus according to the second modification is provided with two comparators 22A1 and 22A2 as the comparator which monitors the gate voltage VG of the transistor M1 and a resistance voltage dividing circuit (R3 to R5) 24 which generates the reference voltages Vc21 and Vc22. The comparators 22A1 and 22A2 compare the VG voltage with the reference voltages Vc21 and Vc22 which are different from each other. A logic circuit 22E is provided in a later stage of the comparators 22A1 and 22A2, and the output of one among the two comparators 22A1 and 22A2 is selected in response to the level of the gate voltage VG, and the output is supplied to the timer circuit 22B and the AND gate 22D.

Figure 12:
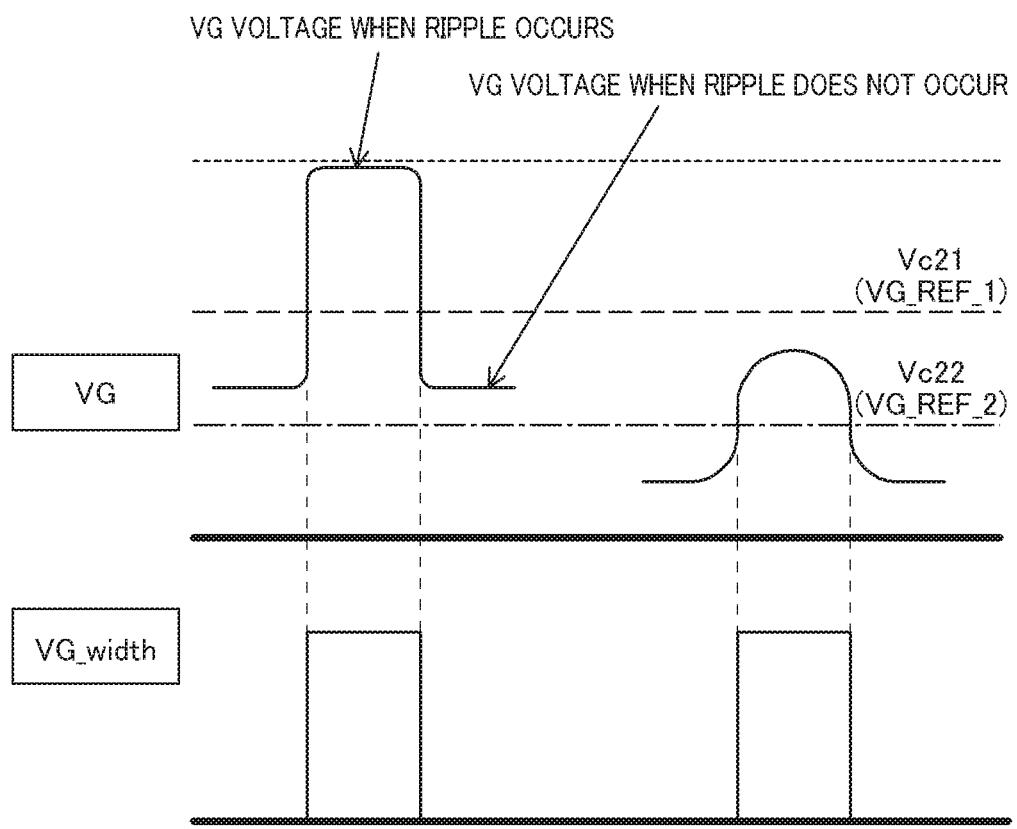
FIG. 12 is a waveform diagram describing how the VG voltage is detected in the power supply apparatus of the second modification.

According to the power supply apparatus of the present embodiment, an external element is used as the current controlling transistor M1, and the characteristic included in the transistor connected as M1 is not clear. Depending on the element selected by the user, the VG voltage may be low. The optimal setting of the reference voltage Vc2 compared by the comparator 22A is a slightly higher value than the lower level of the gate voltage VG. Therefore, as shown in FIG. 12, in the reference voltage Vc21 set to match the high VG voltage, it may not be possible to detect the change of the VG voltage. According to the configuration shown in FIG. 11, when the VG voltage is low, the lower reference voltage Vc 22 is selected and used. Therefore, regardless of the characteristic included in the connected transistor, it is possible to avoid not being able to detect the change.

Figure 13:
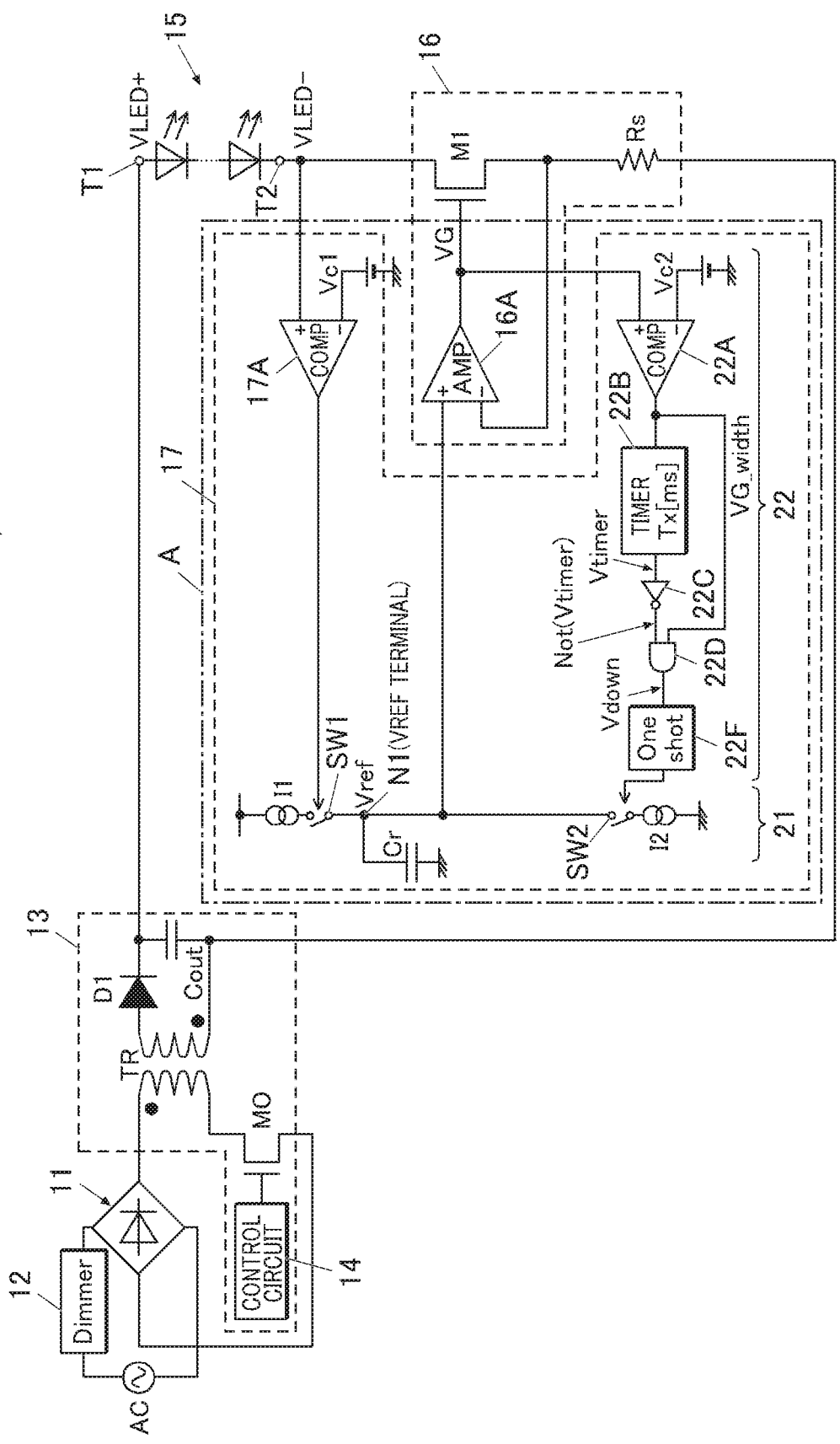
FIG. 13 is a circuit configuration diagram showing a third modification of the power supply apparatus according to the present embodiment.

FIG. 13 is a circuit configuration diagram showing the third modification of the power supply apparatus according to the present embodiment.

According to the power supply apparatus of the third modification, the one shot pulse generating circuit 22F is provided in the later stage of the AND gate 22D of the reference voltage adjustment circuit 17 in the power supply apparatus according to the present embodiment as shown in FIG. 1. The one shot pulse generating circuit 22F synchronizes with the rise of the output of the AND gate 22D and generates a pulse with a predetermined width. According to the power supply apparatus of the third modification, the switch SW2 of the reference voltage generating circuit 21 is turned on by the generated pulse.

According to the power supply apparatus of the embodiment shown in FIG. 1, when the ripple is detected based on the VG voltage, the region longer than the measured time Tx of the timer circuit 22B becomes the width of the down signal. Therefore, the width of the down signal Vdown is large at first, and then as the ripples become smaller, the width gradually becomes narrower. According to the present modification, after Tx passes, the down signal with a predetermined width can be output. According to the control method of the modification, the time to reach the balance point becomes long, but the Vref decrease amount in each cycle can be controlled. Therefore, it is possible to suppress excessive narrowing.

The embodiments of the present invention are described, but the present invention is not limited to the above embodiments. For example, as the dimming control method in the above embodiment, the dimming adjuster 12 with the phase control method is provided before the rectifier circuit 11. However, the present invention is not limited to such control method. For example, a dimming control voltage (DC voltage) or a pulse in a PWM (pulse width modulation) method can be input to the primary side control circuit 14, or the information for dimming can be applied to the secondary side, and the feedback value from the secondary side to the primary side control circuit 14 can be adjusted so that the primary side control circuit 14 performs the dimming control.

According to the present embodiment, as the first potential point in which the DC voltage including the ripple is output from the voltage conversion circuit (13), the output terminal T2 on the low potential side (drain voltage of the transistor M1) is used. However, the first potential point of the present invention can be set anywhere on the current path of the output current from the output portion on the high potential side of the voltage conversion circuit to the current controller (16). According to the present embodiment, the source voltage V_MOS_S is applied as the current detection voltage showing the size of the output current. However, the current detection voltage is not limited to the above, and if the current detection element (current detection resistance, etc.) is provided on a separate position of the output current path, the current detection voltage can be input from such position.

The DC/DC converter 13 is not limited to the flyback type as shown in the above embodiment. Various modifications can be applied such as a forward type converter or a non-insulated switching power supply apparatus not including a transformer. This can also be used in a synchronous rectification method using a switching element instead of the rectification diode D1 connected to the secondary side of the transformer TR.

Further, according to the present embodiment, the present invention is applied to the power supply apparatus which drives the light emitting diode. However, the present invention can be applied widely to apparatuses such as a power supply apparatus which drives an organic EL element for lighting or other power supply apparatuses in which a load is driven by a current.

According to an aspect of the present invention, a power supply apparatus includes, a voltage conversion circuit which generates DC voltage from an input power supply and which outputs the DC voltage between a pair of output terminals; a reference voltage generating circuit which generates an adjustable first reference voltage; a constant current control circuit which includes a current controller which is provided on a current path in which output current flows and which is controlled by voltage and a differential circuit which controls the current controller based on the first reference voltage and current detection voltage showing a size of the output current, and wherein an electric current on the current path is controlled by the current controller; and a reference voltage adjustment circuit which adjusts the first reference voltage generated by the reference voltage generating circuit to converge a ripple occurring in the output current to a predetermined ripple rate or less, based on a voltage of a first potential point set on the current path from an output portion on a high potential side of the voltage conversion circuit to the current controller and a control voltage of the current controller.

According to the above configuration, even if a ripple voltage is included in a DC voltage which is generated from an AC power supply in a voltage conversion circuit and which is output between a pair of output terminals, the constant current control circuit controls the current of the current path in which the output current flows based on the current detection voltage and the reference voltage, and the ripple occurring in the output current can be suppressed. Therefore, an output current in which the ripple is suppressed can be supplied to the load with a low lost. The reference voltage adjustment circuit adjusts the reference voltage so that the ripple in the output current converges to a predetermined ripple rate or less. Therefore, even if the differential circuit includes offset, the ripple rate is not increased nor is the ripple suppressed excessively and the ripple occurring in the output current can be suppressed. Further, the reference voltage is adjusted based on the output voltage of the differential circuit which is more influenced by the ripple than the current detection voltage. Therefore, the ripple occurring in the output current can be suppressed quickly without error operation.

In the power supply apparatus, the differential circuit outputs a driving signal to a control terminal of the current controller to make a potential difference between the first reference voltage and the current detection voltage small.

According to the above configuration, the output current can be controlled to be a desired current value with an operation similar to a well-known constant current regulator.

In the power supply apparatus, the reference voltage generating circuit includes, a voltage holder which holds the first reference voltage, a pull up circuit which includes a first current supply and a first switch connected in series between a power supply voltage terminal and a voltage terminal of the voltage holder, and a first voltage comparator which compares a potential of an output point on a low potential side of the voltage converting circuit in the current path and a predetermined second reference voltage, wherein the first switch is controlled according to a comparison result of the first voltage comparator to pull up the first reference voltage, and a pull down circuit which includes a second current source and a second switch connected in series between the voltage terminal of the voltage holder and a reference potential point, and a second voltage comparator which compares the output voltage of the differential circuit with a predetermined third reference voltage, wherein the second switch is controlled according to a comparison result of the second voltage comparator to pull down the first reference voltage.

According to the above configuration, the reference voltage adjustment circuit which adjusts the generated reference voltage can be realized by only a basic circuit widely used in an electronic circuit. Therefore, the circuit design can be performed easily. The adjustment speed in the direction to pull up the reference voltage and the adjustment speed in the direction to pull down the reference voltage can be easily set by changing the ratio between the current value of the first current source and the current value of the second current source.

In the power supply apparatus, the pull down circuit includes, a timekeeping circuit which starts counting a predetermined duration in response to change in output of the second voltage comparator, and a logic circuit in which, based on output of the timekeeping circuit and output of the second voltage comparator, when the output of the second voltage comparator is longer than the predetermined duration, the second switch is turned on for a duration in which the output of the second voltage comparator is longer than the predetermined duration and a signal to pull down the first reference voltage is generated.

According to the above configuration, the circuit in which the ripple occurring in the output current is converged to a predetermined ripple rate or less can be easily realized by a relatively simple circuit.

In the power supply apparatus, an ability of the pull down circuit to pull down the voltage is lower than an ability of the pull up circuit to pull up the voltage.

The higher the reference voltage is than the suitable value, the current which the current controller can flow becomes larger, and if the current supply ability of the voltage conversion circuit cannot catch up with the current amount which the current controller can flow, the ripple occurring in the output current becomes large. The smaller the reference voltage is than the suitable value, the current which the current controller can flow becomes smaller, and if the output power of the voltage conversion circuit is large, the loss of the current controller becomes high. Therefore, by setting the pull down ability of the voltage of the pull down circuit to be lower than the pull up ability of the voltage of the pull up circuit, the reference voltage can be made larger quickly when the reference voltage is smaller than the suitable value so that the value is gradually converged to the suitable value. With this, for example, when started or when the output power of the voltage conversion circuit is switched to the larger amount, the circuit can quickly respond and the ripple of the output current can be suppressed.

According to another aspect, a semiconductor integrated circuit which is provided in a power supply apparatus including a voltage conversion circuit which generates DC voltage from an input power supply and which outputs the DC voltage between a pair of output terminals, and the semiconductor integrated circuit drives a current controller which controls current in a current flow path in which output current flows, the semiconductor integrated circuit includes, a differential circuit which outputs a driving signal to the current controller to make a potential difference between a first reference voltage and the current detection voltage which shows the size of the output current to be small; and a reference voltage adjustment circuit which adjusts the first reference voltage to suppress a ripple occurring in the output current based on a voltage of a first potential point set on the current path from an output point on a high potential side of the voltage conversion circuit to the current controller and an output voltage of the differential circuit, wherein, the reference voltage adjustment circuit includes, a voltage holder which holds the first reference voltage, a pull up circuit which includes a first current supply and a first switch connected in series between a power supply voltage terminal and a voltage terminal of the voltage holder, and a first voltage comparator which compares a potential of an output point on a low potential side of the voltage converting circuit in the current path and a predetermined second reference voltage, wherein the first switch is controlled according to a comparison result of the first voltage comparator to pull up the first reference voltage, and a pull down circuit which includes a second current source and a second switch connected in series between the voltage terminal of the voltage holder and a reference potential point, and a second voltage comparator which compares the output voltage of the differential circuit with a predetermined third reference voltage, wherein the second switch is controlled according to a comparison result of the second voltage comparator to pull down the first reference voltage.

According to the semiconductor integrated circuit including the above configuration, when embedded in a power supply apparatus in which the DC voltage including the ripple voltage is output from the voltage conversion circuit to the pair of output terminals, the ripple included in the output current of the power supply apparatus can be suppressed in the constant current control circuit and the loss can be reduced.

According to another aspect, a ripple suppressing method which drives a current controller which controls current in a current flow path in which output current flows to suppress a ripple occurring in the output current in a power supply apparatus including a voltage convertor which generates DC voltage from an input power supply and which outputs the DC voltage between a pair of output terminals, the method includes, generating an error amplifying signal between a current detection voltage which shows a size of the output current and a first reference voltage as a driving signal of the current controller; controlling a duration in which voltage of the driving signal of the current controller increases by adjusting a voltage value of the first reference voltage; and suppressing ripple current flowing in a load so that the ripple is a predetermined ripple current rate or lower.

According to the above method, even if the DC voltage including the ripple voltage is output from the voltage conversion circuit to the pair of output terminals, the current controller can suppress the ripple in the output current, and the loss in the current controller can be reduced.

Here, according to the adjustment method of the voltage value of the reference voltage, a potential on a lower potential side between the pair of output terminals is monitored to adjust a voltage value of the first reference voltage in a direction to be increased when the potential on the low potential side is higher than a predetermined potential, and a term in which the voltage of the driving signal in the current controller is high is monitored to adjust the voltage value of the first reference voltage in a direction to be decreased when the term that the voltage of the driving signal is high is longer than a predetermined duration.

According to the above invention, it is possible to provide a power supply apparatus, a semiconductor integrated circuit, and a ripple suppressing method in which, in a power supply apparatus which converts an AC power supply to a DC voltage and supplies the voltage to a load, even if there is offset in the comparator or the operational amplifier included in the control circuit, the ripple occurring in the output current can be suppressed without increasing the ripple rate nor excessively suppressing the ripple.

Although some embodiments of the present invention have been described and illustrated in detail, the disclosed embodiments are made for purposes of not limitation but illustration and example only. The scope of the present invention should be interpreted by terms of the appended claims.

What is claimed is:

1. A power supply apparatus comprising:
   a voltage conversion circuit which generates DC voltage from an input power supply and which outputs the DC voltage between a pair of output terminals;
   a reference voltage generating circuit which generates an adjustable first reference voltage;
   a constant current control circuit which includes a current controller which is provided on a current path in which output current flows and which is controlled by voltage and a differential circuit which controls the current controller based on the first reference voltage and a current detection voltage showing a size of the output current, an electric current on the current path being controlled by the current controller; and
   a reference voltage adjustment circuit which adjusts the first reference voltage generated by the reference voltage generating circuit to converge a ripple occurring in the output current to a predetermined ripple rate or less, based on a voltage of a first potential point set on the current path from an output portion on a high potential side of the voltage conversion circuit to the current controller and a control voltage of the current controller,
   wherein the reference voltage generating circuit includes:
      a voltage holder which holds the first reference voltage;
      a pull up circuit which includes a first current source and a first switch connected in series between a power supply voltage terminal and a voltage terminal of the voltage holder, and a first voltage comparator which compares a potential of an output point on a low potential side of the voltage converting circuit in the current path and a predetermined second reference voltage, the first switch being controlled according to a comparison result of the first voltage comparator to pull up the first reference voltage; and
      a pull down circuit which includes a second current source and a second switch connected in series between the voltage terminal of the voltage holder and a reference potential point, and a second voltage comparator which compares an output voltage of the differential circuit with a predetermined third reference voltage, the second switch being controlled according to a comparison result of the second voltage comparator to pull down the first reference voltage.

2. The power supply apparatus according to claim 1, wherein the differential circuit outputs a driving signal to a control terminal of the current controller to make a potential difference between the first reference voltage and the current detection voltage small.

3. The power supply apparatus according to claim 1, wherein the pull down circuit includes:
   a timekeeping circuit which starts counting a predetermined duration in response to a change in an output of the second voltage comparator; and
   a logic circuit in which, based on an output of the timekeeping circuit and an output of the second voltage comparator, when the output of the second voltage comparator is longer than the predetermined duration, the second switch is turned on for a duration in which the output of the second voltage comparator is longer than the predetermined duration and a signal to pull down the first reference voltage is generated.

4. The power supply apparatus according to claim 1, wherein an ability of the pull down circuit to pull down the voltage is lower than an ability of the pull up circuit to pull up the voltage.

5. A semiconductor integrated circuit which is provided in a power supply apparatus including a voltage conversion circuit which generates DC voltage from an input power supply and which outputs the DC voltage between a pair of output terminals, the semiconductor integrated circuit driving a current controller which controls current in a current flow path in which output current flows, and the semiconductor integrated circuit comprising:
   a differential circuit which outputs a driving signal to the current controller to make a potential difference between a first reference voltage and a current detection voltage which shows a size of the output current to be small; and
   a reference voltage adjustment circuit which adjusts the first reference voltage to suppress a ripple occurring in the output current based on a voltage of a first potential point set on the current path from an output point on a high potential side of the voltage conversion circuit to the current controller and an output voltage of the differential circuit,
   wherein the reference voltage adjustment circuit includes:
      a voltage holder which holds the first reference voltage;
      a pull up circuit which includes a first current source and a first switch connected in series between a power supply voltage terminal and a voltage terminal of the voltage holder, and a first voltage comparator which compares a potential of an output point on a low potential side of the voltage converting circuit in the current path and a predetermined second reference voltage, the first switch being controlled according to a comparison result of the first voltage comparator to pull up the first reference voltage; and
      a pull down circuit which includes a second current source and a second switch connected in series between the voltage terminal of the voltage holder and a reference potential point, and a second voltage comparator which compares the output voltage of the differential circuit with a predetermined third reference voltage, the second switch being controlled according to a comparison result of the second voltage comparator to pull down the first reference voltage.

6. A ripple suppressing method which drives a current controller which controls current in a current flow path in which output current flows to suppress a ripple occurring in the output current in a power supply apparatus including a voltage convertor which generates DC voltage from an input power supply and which outputs the DC voltage between a pair of output terminals, the method comprising:

generating an error amplifying signal between a current detection voltage which shows a size of the output current and a first reference voltage as a driving signal of the current controller;

controlling a duration in which a voltage of the driving signal of the current controller increases by adjusting a voltage value of the first reference voltage; and suppressing ripple current flowing in a load so that the ripple is a predetermined ripple current rate or lower, wherein a potential on a lower potential side between the pair of output terminals is monitored so that, when the potential on the lower potential side is higher than a predetermined potential, a voltage value of the first reference voltage is adjusted in a direction to be increased, and wherein a term in which the voltage of the driving signal is high is monitored so that, when the term in which the voltage of the driving signal is high is longer than a predetermined duration, the voltage value of the first reference voltage is adjusted in a direction to be decreased.

* * * * *